United States Patent
Furrer et al.

(10) Patent No.: US 9,731,626 B2
(45) Date of Patent: Aug. 15, 2017

(54) DEVICE HAVING TWO RIGID CONDUCTOR RAILS AND A SECTION INSULATOR

(71) Applicant: Furrer + Frey AG, Bern (CH)

(72) Inventors: Beat Furrer, Bern (CH); Beat Rothlisberger, Ostermundingen (CH); Bruno Casali, Toffen (CH)

(73) Assignee: Furrer + Frey AG, Bern (CH)

( * ) Notice: Subject to any disclaimer, the term of this patent is extended or adjusted under 35 U.S.C. 154(b) by 80 days.

(21) Appl. No.: 14/403,525

(22) PCT Filed: May 16, 2014

(86) PCT No.: PCT/EP2014/060104
§ 371 (c)(1),
(2) Date: Nov. 24, 2014

(87) PCT Pub. No.: WO2014/187745
PCT Pub. Date: Nov. 27, 2014

(65) Prior Publication Data
US 2016/0272088 A1    Sep. 22, 2016

(30) Foreign Application Priority Data
May 22, 2013 (EP) .................................. 13002679

(51) Int. Cl.
*B60M 1/18* (2006.01)
*H01B 17/02* (2006.01)
(Continued)

(52) U.S. Cl.
CPC ............. *B60M 1/18* (2013.01); *B60M 1/02* (2013.01); *H01B 9/008* (2013.01); *H01B 17/02* (2013.01)

(58) Field of Classification Search
CPC ............................... B60M 1/18; H01B 17/02
(Continued)

(56) References Cited

U.S. PATENT DOCUMENTS 4,424,889 A * 1/1984 Hockele .................. B60M 1/18
  191/39
5,810,137 A * 9/1998 White ...................... B60M 1/18
  174/137 R
(Continued)

FOREIGN PATENT DOCUMENTS

CA        1116707 A1      1/1982
CA        2816756 A1 *    5/2012  .............. B60M 1/18
(Continued)

OTHER PUBLICATIONS

International Search Report and Written Opinion, PCT/EP2014/060104, dated Jul. 14, 2014, 9 pages.
(Continued)

*Primary Examiner* — Zachary Kuhfuss
(74) *Attorney, Agent, or Firm* — Senniger Powers LLP

(57) ABSTRACT

The section insulator for rigid conductor rails has conductive runners, a ramp and an insulating runner, each connected to one conductor rail. The conductor runners (7, 7') and the ramps (11, 11') are connected to one another at one end and at their other ends to the conductor rail, wherein the latter mentioned ends are offset relative to each other in the longitudinal direction (3). The two conductor rails (1, 2) are rigidly and torsion-resistantly connected to one another by insulating profiles (5, 6). Insulating runners (14, 14') are attached to the insulating profiles opposite the respective conductive runner, so that a current collector is properly guided when passing by. An insulating spacing is present between the ends of the conductive runners (7, 7') and the ends of the closest insulating runner (14, 14').

18 Claims, 8 Drawing Sheets

(51) Int. Cl.
*B60M 1/02* (2006.01)
*H01B 9/00* (2006.01)

(58) Field of Classification Search
USPC .......................................................... 191/39
See application file for complete search history.

(56) References Cited

U.S. PATENT DOCUMENTS

| | | | |
|---|---|---|---|
| 6,206,156 B1 | 3/2001 | Nunlist | |
| 8,069,965 B2 * | 12/2011 | Maynar | B60M 1/18 |
| | | | 191/22 R |
| 9,024,194 B2 * | 5/2015 | Furrer | B60M 1/18 |
| | | | 174/138 R |
| 2010/0133055 A1 * | 6/2010 | Melis Maynar | B60M 1/30 |
| | | | 191/39 |
| 2014/0144672 A1 | 5/2014 | Furrer et al. | |

FOREIGN PATENT DOCUMENTS

| | | | | |
|---|---|---|---|---|
| DE | 1163894 B | 2/1964 | | |
| EP | 0052176 A1 | 3/1985 | | |
| EP | 0592819 B1 | 11/1996 | | |
| FR | 2140934 A5 | 1/1973 | | |
| FR | EP 0064442 A1 * | 11/1982 | .............. | B60M 1/18 |
| JP | S60234034 A | 11/1985 | | |
| JP | 2004314914 A | 11/2004 | | |

OTHER PUBLICATIONS

European Search Report and Written Opinion, EP13002679, dated Oct. 14, 2013, 5 pages.
Abstract of JPS60234034; Nov. 20, 1985.

* cited by examiner

DEVICE HAVING TWO RIGID CONDUCTOR RAILS AND A SECTION INSULATOR

REFERENCE TO RELATED APPLICATIONS

This application is a U.S. national stage application of International Patent Application No. PCT/EP2014/060104, filed May 16, 2014, and claims the benefit of priority of European Application No. 13002679.2, filed May 22, 2013, the entire disclosures of which are incorporated herein by reference.

FIELD OF THE INVENTION

The invention relates to a device having two rigid conductor rails and a section insulator with spacing between the conductor rails which is bridged by the section insulator and conductive and insulating runners project into the spacing.

BACKGROUND

Such a device is known from DE 10 2010 051 379 B4. Two aligned rigid conductor rails, together with the section insulator form a closed system in that, as an extension of each conductor rail, a conductive runner and an insulating runner rigidly connected to the conductive runner are connected to the opposing conductor rail. The lower side of all the runners, facing the travel plane, is disposed in a contact plane. All of the runners are also height-adjustable in relation to the conductor rails. In practice, it happens that the opposing conductor rails become deformed, for example, as a result of thermal influences, which may then also deform the section insulator, such that the conductive runners and the insulating runners thereof are no longer properly situated in a plane parallel to the travel plane. This leads to complicated readjustments and may result in vibrations in the section insulator and, therefore, to spark formation as well.

WO 99/03700 shows two aligned rigid conductor rails, the opposite ends of which have a first spacing between them. One electro-conductive runner each is connected to these ends, the two runners projecting into the first spacing, running substantially antiparallel to each other in a second spacing, this second spacing being selected such that at the operating voltage of the conductor rails a safe galvanic insulation is ensured, which also means that no spark discharges between the runners can occur. The electro-conductive runners and the adjacent conductor rails, at least with their lower side facing the travel plane, are disposed in a plane, referred to as a contact plane. In relation to the running direction, i.e., the conductor rail longitudinal axis, the two electro-conductive runners converge, so that the current collector of a vehicle when passing the section insulator is always in electrical contact with at least one of the runners and contacts it.

The known runners are angled relative to the conductor rail longitudinal axis and each have a free, unsecured end facing in the direction of the opposing conductor rail. In this respect, it is an open system. Moreover, the free ends of the electro-conductive runners are each bent upwardly away from the travel plane in order to achieve a gentle entry of the current collector of a vehicle, and to avoid a "threading" of the current collector or a shock when reaching the free end of the runner.

EP 0 052 176 B1 shows a section insulator for contact wires suspended on chain supporting structures, the opposite ends of which are spaced apart from each other. Both ends of the contact wires are connected to each other via parallel, insulating strips, which are contacted by the current collector of a passing vehicle. Also attached to the ends of the two contact wires is an arcing horn. In the transition area between the two contact wires, the contract strip of the vehicle contacts only the insulating strips so that the vehicle has no power supply. Due to the inductance of the electric motors of the vehicle, high voltage peaks can occur, which is why the arcing horns are provided. Nevertheless, spark formation is undesired for the reasons set forth above.

EP 0 592 819 B1 shows a section insulator for contact wires suspended on catenary structures, the opposing ends of which are connected to each other by electrically insulating runners. Attached to both ends of the contact wires are arcing horns with runner ramps, which project into a first space between the two contact wires, and which have a second space relative to each other. Connected to one of the two arcing horns are electro-conductive runners extending parallel to the insulating runners, and which extend so far in the direction of the opposing arcing horn that the point of separation between the two conductive runners is sufficient bridged. Here, the lower sides of the runner leads, the insulating runners and the conductive runners facing the travel plane are intended to be disposed in precisely one plane and themselves to be preferably flat in design. In addition, the two insulating runners are also intended to have an arc protection means, such that a total of seven element, namely, two conductive runners, two insulating runners, two arc protection means and one runner lead are to be contacted by the current collector. It is difficult, however, to precisely align seven elements in one plane. Moreover, as a result of variable wear such as, for example, abrasion or burn off, the individual elements can be worn to varying degrees, such that air gaps and, therefore, spark formation again occur between the contact strip and the electro-conductive runners.

JP 60234034 A shows a section insulator for contact wires suspended on catenary supporting structures, the ends of which are deflected laterally counter to one another in the area of the section insulator and extend antiparallel and spaced apart from one another. The free ends of the contact wires are connected to the respective, other contact wire via an insulator. In addition, the contact wires in the area of the section insulator are bent upwardly out of the travel plane in such a way that they intersect in side view. The contact strip of a passing vehicle must track the change in height if a constant contact with the contact wire is to be maintained, which is impossible at higher speeds. Thus, the problems described above also occur.

DE 28 37 370 A1 shows a connection device for electric contact wires suspended via hangers to a bearer cable. Here too, each contact wire for a section insulator is divided into a conductive runner and an insulating runner, the two being kept apart from one another by an insulator extending transversely to the longitudinal extension of the contact wire, and the insulator being fastened via a hanger to the bearer cable.

DE 11 63 894 B shows a similar section insulator, in which an insulator disposed transversely to the longitudinal extension of the contact wire also separates the respective branches.

FR 2 140 934 A5 also shows a section insulator having contact wires spread apart in a conductive runner and an insulating runner, respectively.

The object of the present invention is to improve the section insulator of the aforementioned kind so that it ensures a constant contact between a current collector and a contact wire in rigid conductor rails, and the problems involving spark formation are avoided. This includes all of the problems mentioned above which may lead to spark formation. Nor should the opposing conductor rails be able to impose any internal deformation on the section insulator.

SUMMARY OF THE INVENTION

This object is achieved by the features set forth in patent claim 1. Advantageous embodiments and refinements of the invention are found in the dependent claims.

The section insulator according to the invention has at each of the opposing ends of the rigid conductor rails
a conductive runner
a ramp and
an insulating runner,
which are disposed in mirror symmetry to a central longitudinal axis of the conductor rails, and which project into a first spacing. Both conductor rails are rigidly connected to one another by a linear insulating profile bridging the first space. The insulating runners are fastened to the insulating profile and extend at an acute angle relative to the insulating profile.

One end of the insulating runners is electrically and mechanically connected to the associated conductor rail, and the other end to the ramp. In this arrangement, the conductive runners, starting from the conductor rail, are formed in the longitudinal direction of the conductor rail in a first section, and extending diagonally outward in a second section, the runners being connected at their other end to a first end of the ramp. The other end of the ramp is connected to the conductor rail.

Thus, the section insulator is stiffer in design than the conductor rail itself. As a result, the conductor rail can no longer impose any inner deformation on the section insulator. A further advantage is that the air gap between the conductive runners and the insulating runners is enlarged and the insulating section is therefore improved.

BRIEF DESCRIPTION OF THE DRAWINGS

The invention is described in greater detail below with reference to an exemplary embodiment in conjunction with the drawing, in which:

FIG. 8 shows a section along the line C-C of FIG. 1; and

DETAILED DESCRIPTION OF PREFERRED EMBODIMENTS

Figure 1:
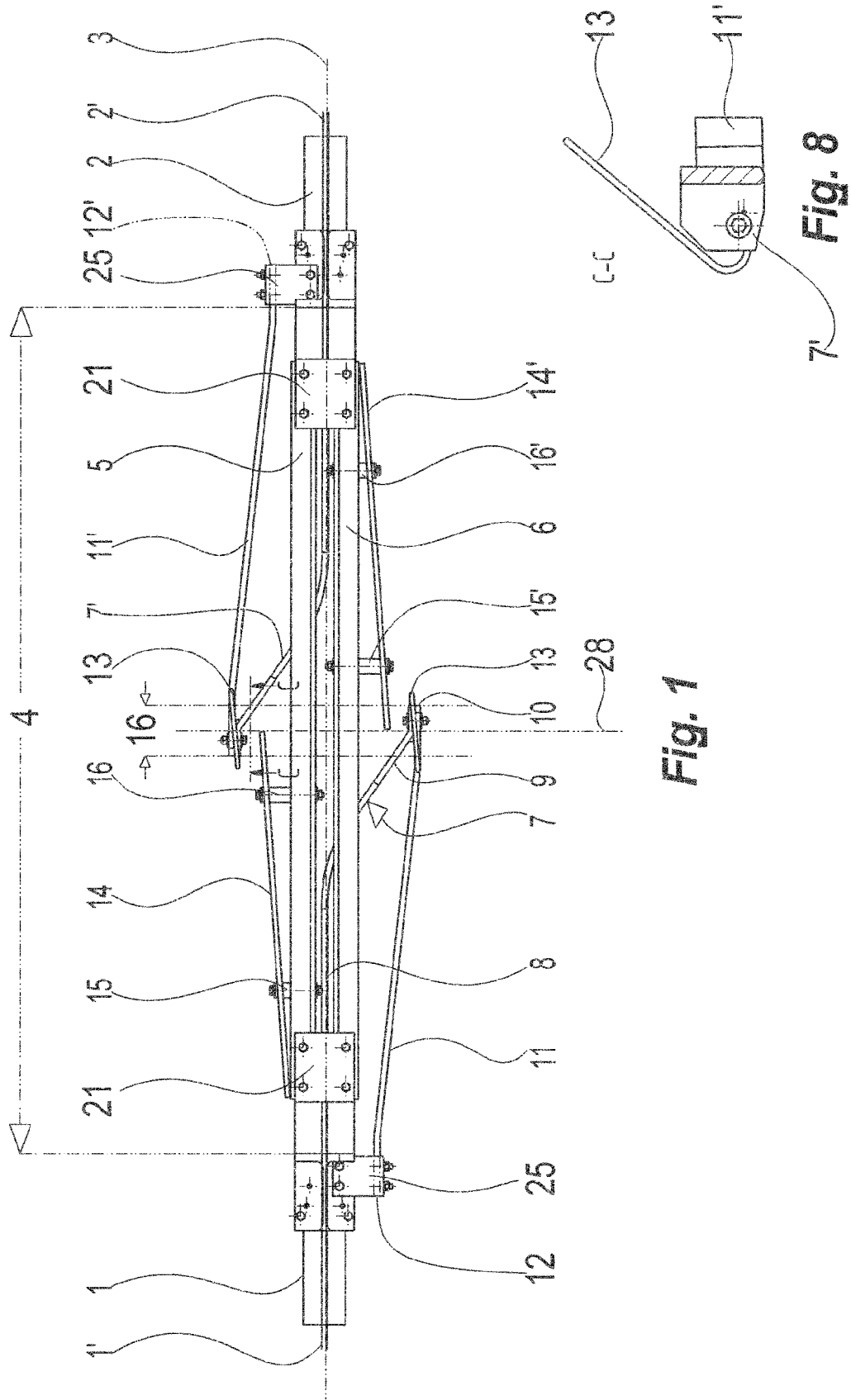
FIG. 1 shows a view of the upper side of the section insulator according to the invention.

In the view of FIG. 1, two rigid conductor rails 1 and 2 may be seen which are arranged aligned along a center axis 3, and each hold a contact wire 1', 2'. Facing ends of the conductor rails 1 and 2 are arranged at a spacing 4 relative to one another, which is bridged by the section insulator according to the invention. The section insulator in this case has 2 rigid insulating profiles 5 and 6, which are rigidly connected to the ends of the two conductor rails 1 and 2 and extend parallel to the center axis 3, a spacing being present between the two.

Electrically connected to the first conductor rail 1 is a first conductive runner 7, a first section 8 of which extends between the two insulating profiles 5 and 6 along the center axis 3, and a second section 9 of which extends at an angle diagonally outward, the second section 9 crossing the insulating profile 6 in the top view of FIG. 1. A free end 10 of the conductive runner 7 is connected to an electrically conductive ramp 11, the other end 12 of which is electrically and mechanically connected to the first conductor rail 1. Thus, the ramp 11 extends at an acute angle relative to the center axis 3. An arcing horn 13 is also attached to the free end 10 of the conductive runner 7.

The fastening points of the conductive runner 7 and the ramp 11 are disposed offset relative to one another in the longitudinal direction of the center axis 3, such that in the top view the fastening points and the shared connection point at the free end 10 of the conductive runner 7 form a triangle which, together with the dimensioning of the rigid conductive runner 7 and the equally rigid ramp 11, ensure sufficient stability.

Attached to the insulating profile 5 on the side of the center axis 3 opposite the conductive runner 7 and the ramp 11 is an insulating runner 14, which is splayed laterally over varying distances 15 and 16 in such a way that the insulating runner 14 also extends at an acute angle relative to the center axis 3. The lower sides of the conductive runner 7 facing the travel plane, the ramp 11 and the insulating runner 14 lie substantially in one plane, the ramp 11 being slightly inclined, however, in the longitudinal direction of the center axis 3, which is apparent from FIG. 2.

Attached to the second conductor rail 2 in an analogous manner are also a conductive runner 7', a ramp 11' and an insulating runner 14', their configuration being mirror symmetrical relative to the center axis 3 and mirror symmetrical relative to a vertical center plane 28. This center plane 28 is perpendicular to the contact plane and perpendicular to the center longitudinal axis 3.

These elements 7, 11 and 14, as well as 7', 11' and 14' face one another and bridge the spacing 4, the ends thereof facing one another overlapping in an overlap area 16 in such a way that a contact strip of a pantograph of a passing vehicle is in constant contact with at least one of the two conductive runners 7 and 7', and with both conductive runners 7 and 7' in the overlap area 16. The two insulating runners 14 and 14' also partially project into the overlap area 16 in such a way that the contact strip of the pantograph is guided correctly in this area as well.

The electrical connection between the conductor rail 1, 2 and the conductive runner 11, 11' associated with it, is formed by a connecting bracket 17, which is fastened with screws 18 to the associated conductor rail and projects past the end of the respective conductor rail into the spacing 4, where it is connected to the associated conductive runner 7, 7' via a screw 19 and a spacer sleeve 20. The spacer sleeve 20 is dimensioned so that the first section 8, 8' of the conductive runner 7, 7' is centered relative to the midline 3, so that the respective contact wire 1', 2' is aligned with the associated conductive rail 1, 2.

The mechanical connections between the conductor rails 1 and 2 and the insulating profiles 5 and 6 are formed via profiles which in this case are designed as double-T profiles 21, and which are screwed to the conductor rails 1 and 2. In the exemplary embodiment depicted herein, a lower horizontal section 22 of the double-T profile 21 is screwed to the upper side of the conductor rail 1, 2. When using conductor rails with a different profile, the attachment may be formed at a different point and in a different manner.

An upper, horizontal section 23 of the double-T profile 21 is connected to the two insulating profiles 5 and 6, specifically, also screwed together. The two horizontal sections 22 and 23 of the double-T profile 21 are connected to one another by a vertical section 24, the vertical section 24 being slanted such that the upper horizontal section 23 is shorter than the lower horizontal section 22.

By connecting the two conductor rails 1 and 2 via the double-T profile and the insulating profiles 5 and 6, a very stable construction is achieved, in which the section insulator is ultimately more rigidly designed than the conductor rail itself. In this way, the conductor rail is no longer able to impose any internal deformation on the section insulator.

The electrically conductive ramps 11 and 11' are fastened via L-shaped brackets 25, which are screwed to the lower horizontal section 22 of the double-T profile 21, the ramps 11, 11' being screwed to a vertical section of the bracket 25. As is apparent from FIG. 2, the electrically conductive ramps 11 and 12, starting from the respective conductor rail, are inclined slightly downward in order to ensure a gentle entry for a current collector when passing by.

Figure 3:
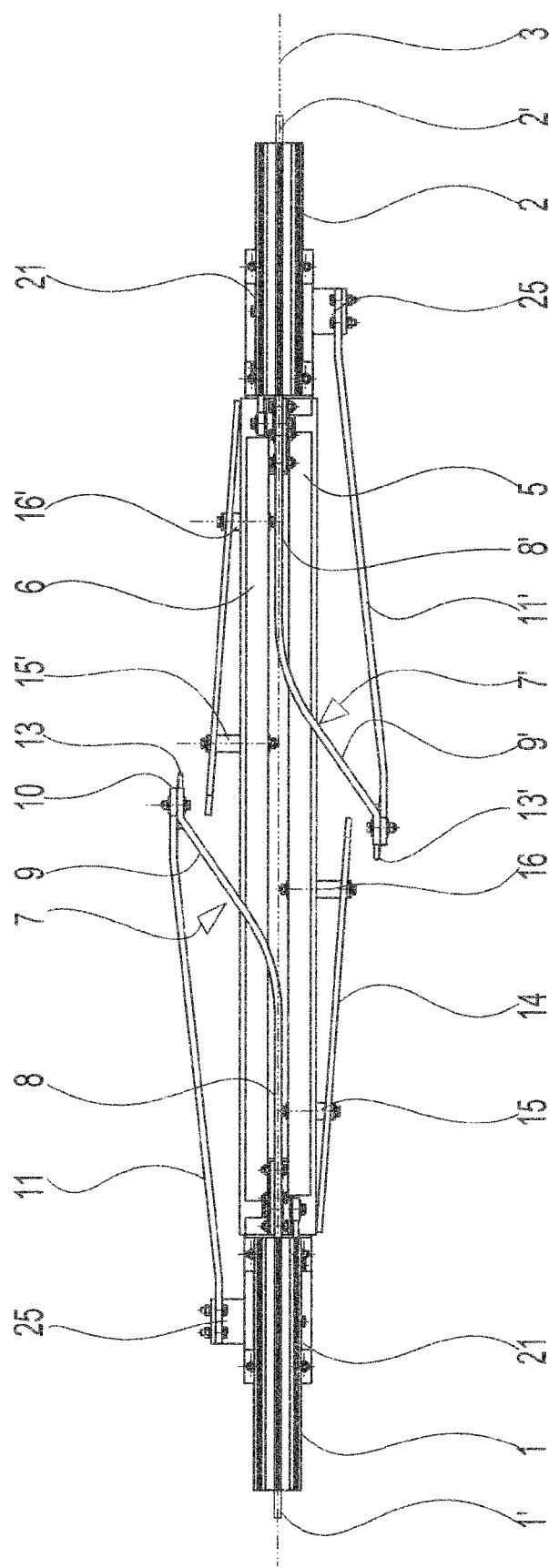
FIG. 3 shows a view of the lower side of the section insulator according to the invention facing the travel plane.
Figure 4:
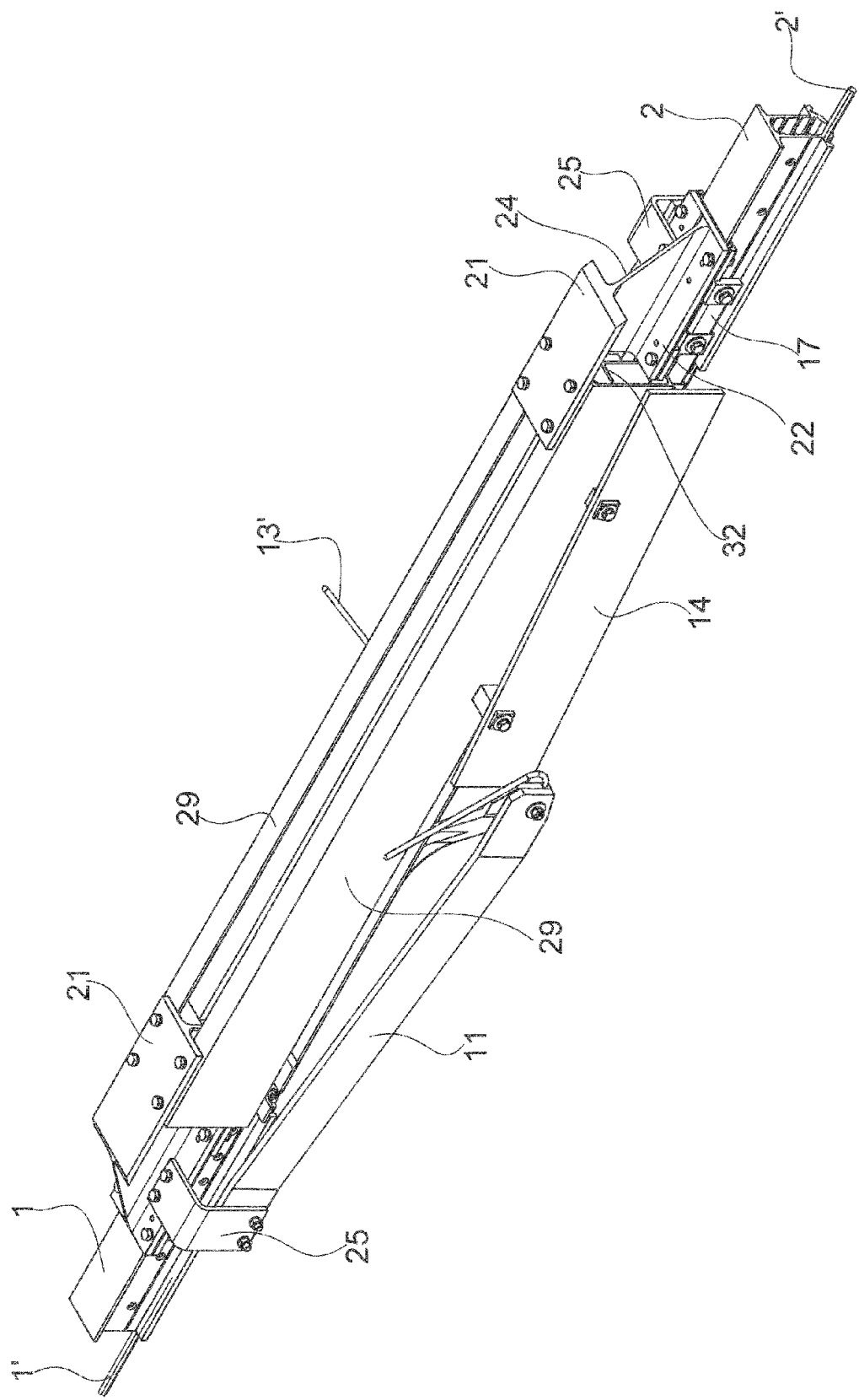
FIG. 4 shows a perspective view of the section insulator according to the invention.

FIG. 3 shows a view of the lower side of the section insulator facing the travel plane, i.e., the "contact plane". Here, it is clearer to see how the conductive runners 7 and 7' as an extension of the associated conductor rails 1, 2 extend initially in a straight line in a first section 8, 8' between the profiles 5 and 6, and then at a bend in a second section 9, 9' are angled outward until their free end 10 is connected to the associated ramp 11, 11' and the arcing horn 13, 13'. In this arrangement, the conductive runner 7, 7' crosses one of the profiles 5 or 6, and, as is clearly depicted in FIG. 9, has a recess 26, which is partially visible also in the perspective view of FIG. 4.

Figure 2:
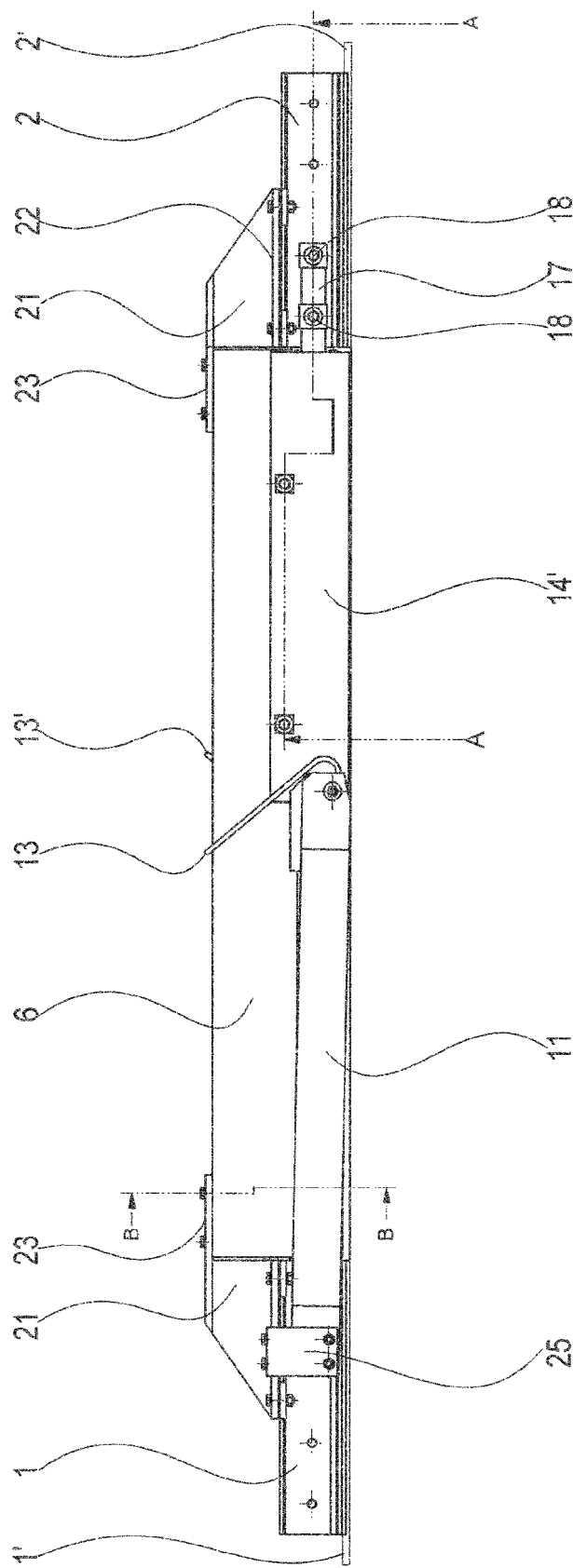
FIG. 2 shows a side view of the section insulator of FIG. 1.
Figure 5:
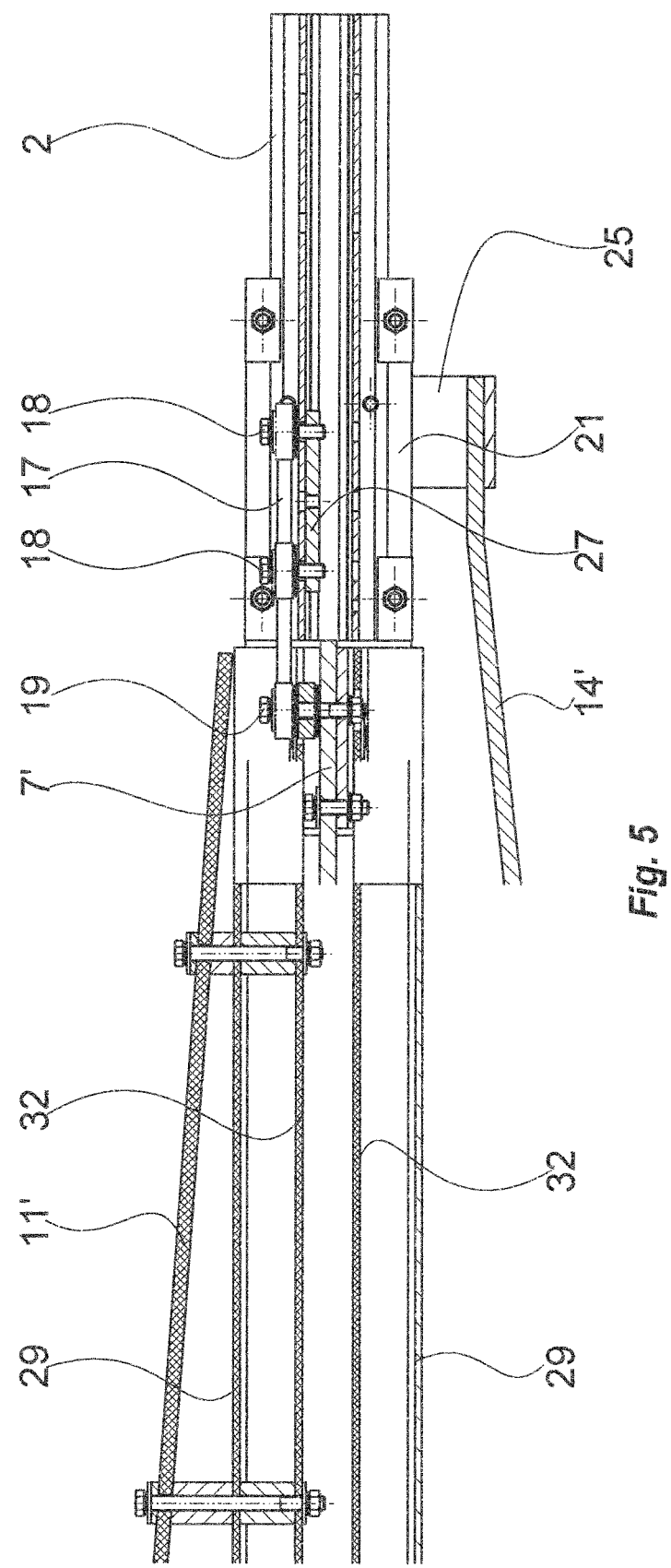
FIG. 5 shows a section along the line A-A of FIG. 3.

FIG. 5 shows a section along the line A-A of FIG. 2. More clearly seen here is the connection of the conductive runner 7' with the conductor rail 2 via the connecting bracket 17, which provides an electrically strong conductive connection and a mechanically stable support. The connecting bracket 17 is screwed to the conductor rail 2 by two screws 18, a counter plate 27 being attached to the inside of the conductor rail 2, into which the screws 18 are screwed. The connecting bracket 17 extends past the end of the conductor rail 2 and is connected via a spacer sleeve and a screw 19 to the conductive runner 7'.

Figure 6:
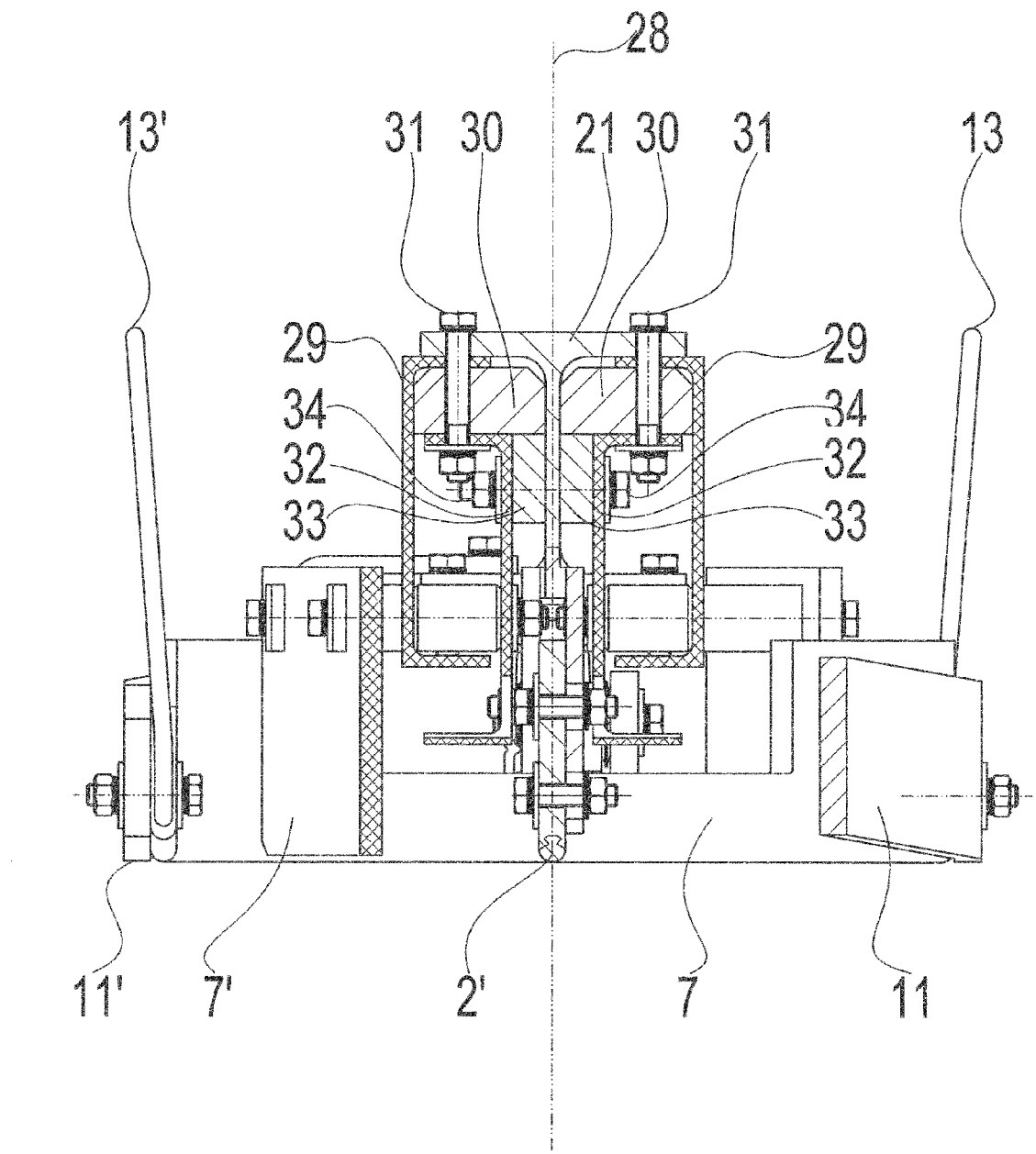
FIG. 6 shows a section along the line letter B-B of FIG. 2.

FIG. 6 shows a section along the line B-B of FIG. 2. Attached to the double-T profile 21 mirror symmetrically relative to a vertical center plane 28 is a first outer chassis 29 made of an electrically insulating material such as, for example, glass fiber reinforced plastic, which has a U-shaped cross-section. Substantially rectangular spacers 30 are disposed on both sides of the vertical section 24 of the double-T profile, which are fastened with screws 31 to the upper horizontal section 23 of the double-T profile, a horizontal section of the first chassis 29 being clamped in. In this arrangement, the spacers 30 are relatively short in the longitudinal direction and serve merely to fasten the chassis elements to the double-T support 21. In the direction of the spacing 4, they extend only approximately over the length of the double-T support 21.

Attached to the lower side of the spacers 30 facing the travel plane are two chassis elements 32 made of an electrically insulating material such as, for example, glass fiber reinforced plastic, which are connected by the screws 31 to the spacers 30. Attached directly adjacent to the spacers 30 are additional spacers 33, which are screwed together by a screw 34 against the vertical section 24 of the double-T profile 21, and in the process, penetrate the vertical section of the second chassis 32. The other spacers 33 are also relatively short in the longitudinal direction and extend only to the end of the double-T support 21 facing the spacing 4. The spacers 30 and 33 in this case are dimensioned so that they mechanically connect the chassis elements 29 and 32 as rigidly and torsion-resistantly as possible to the double-T profiles 21.

Figure 7:
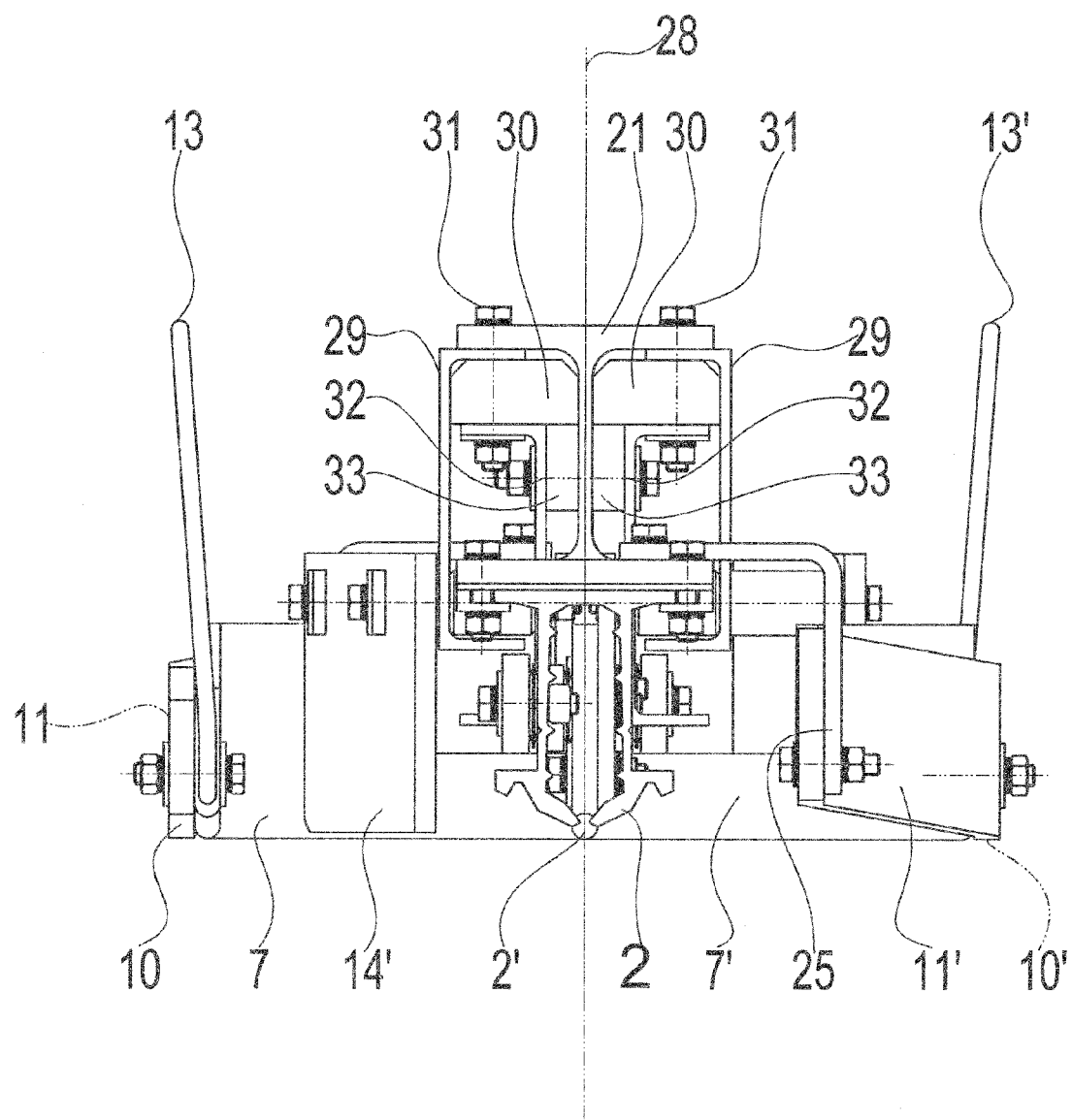
FIG. 7 shows a frontal view of the section insulator.

FIG. 7 shows a frontal view of the section insulator, including a conductor rail 2 leading to the section insulator, in which the contact wire 2' is clamped. Thus, in contrast to the sectional view of FIG. 6, the conductor rail 2 may still be seen on which the double-T profile 21 is screwed. Also visible is the front side of the spacers 30 and 33, to which the chassis elements 29 and 32 are screwed. The chassis elements 29 and 32 as a pair, respectively, form one of the insulating profiles 5 and 6 shown in FIG. 1. These are, as is best shown by the cross-hatching in FIG. 6, in each case two U-shaped profiles nested within one another. Also visible is the L-shaped bracket 25 to which the ramp 11' is connected, the free end 10' of which is connected to the free end of the conductive runner 7', the other end of which reaches to the center plane 28. All remaining parts were already explained in conjunction with the sectional view of FIG. 6.

FIG. 8 shows a section along the lines C-C of FIG. 1 of the end of the conductive runner 7', the ramp 11' and the arcing horn 13'. In this view, the conductive runner 7' is cut.

Figure 9:
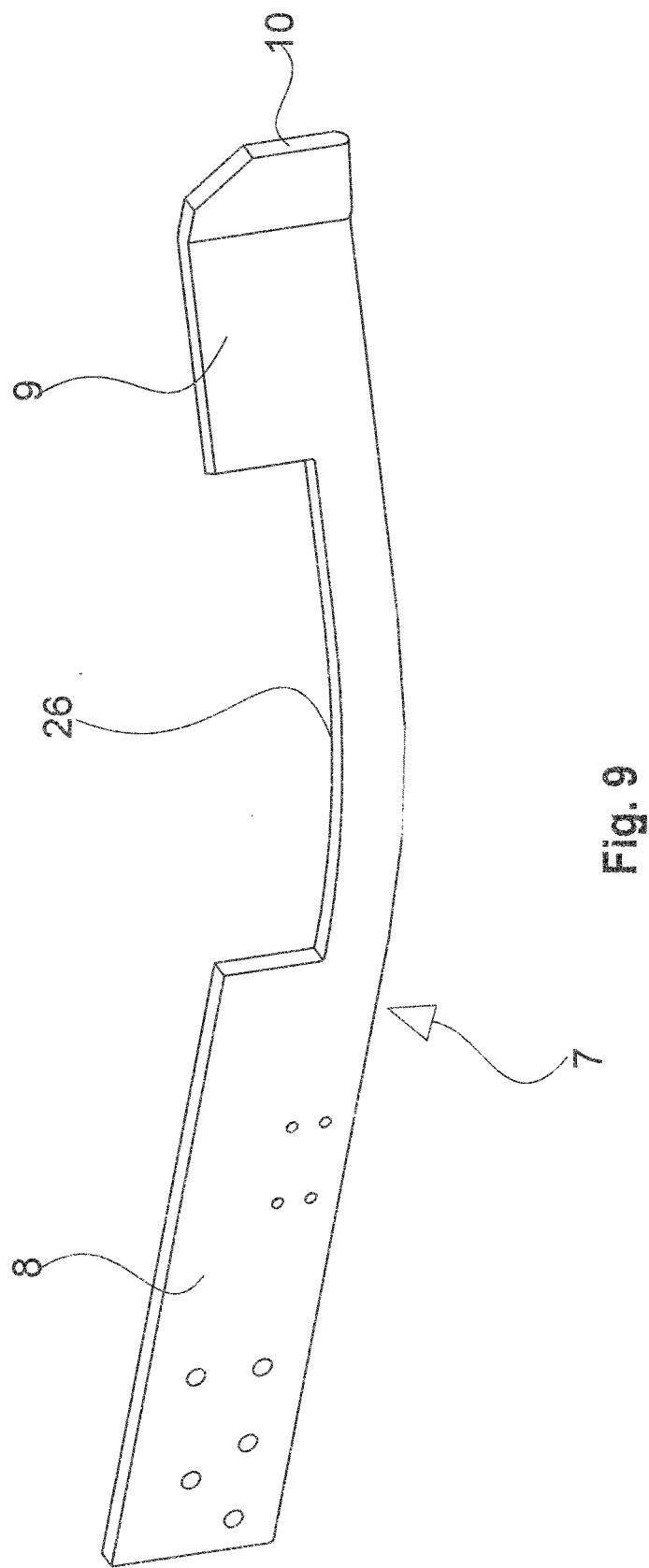
FIG. 9 shows a perspective view of a conductive runner.

FIG. 9 shows a perspective view of a conductive runner with both sections 8 and 9 and the recess 26. The conductive runner and also the ramp are very robustly designed with respect to their profile height, and thus, their bending resistance, such that in the case of potential contact pressure of a current collector, which is maximally 25-30 kp, they are barely able to become deformed, even at speeds of 250 km/h.

It should also be mentioned that the ramps and conductive runners joined to the section insulators serve to prevent the contact strip of a current collector from being able to fall into a "hole", because this arrangement ensures that the contact strip always slides on a conductive runner and a ramp. The additional spacing between the insulating runner and the conductive runner, i.e., for example, between conductive runner 7 and insulating runner 14', and between conductive runner 7' and insulating runner 14, is provided for electrical reasons. The air gap situated there between these elements in the overlap area results in an improvement in the electrical insulation and, therefore, in a further improvement of the section insulator. Thus, for example, also in the case of humidity or moisture, no leakage current is able to run from the conductive runners via the insulating runners, which would be possible in the case of a rigid connection, whereby a section switched off for maintenance purposes could then still be under voltage. Because the fastening points of conductive runner on the double-T profile 21, the ramp on the conductor rail 1 and their shared connection point at free end 10 of the conductive runner 7 form a triangle, a sufficient stability is also ensured with the rigid profiles used.

FIG. 9 shows a perspective view of a conductive runner with the two sections 8 and 9 and the recess 26.

The invention claimed is:
1. A device having two rigid conductor rails and a section insulator, wherein opposing ends of the conductor rails have a first spacing relative to one another, which spacing is bridged by the section insulator, wherein each conductor rail is connected directly or indirectly to a conductive runner, a ramp and an insulating runner, which project into the spacing and are disposed in mirror symmetry relative to a center longitudinal axis of the conductor rails and relative to a vertical transverse plane, wherein both conductor rails are rigidly connected to one another by straight-line insulating profiles bridging the spacing, characterized in that the insulating runners are fastened to the insulating profiles and extend at an acute angle relative to the center longitudinal axis, one end of the conductor runners is electrically and mechanically connected to the associated conductor rail and the other end to the associated ramp, the conductive runners, starting from the associated conductor rail, extend in a first section in the longitudinal direction of the conductor rails and in a second section diagonally outward, and the free end thereof is connected to a first free end of the associated ramp, and a second end of the ramp is connected to the associated conductor rail.

2. The device according to claim 1, characterized in that the conductive runners and the ramps in the direction of the center longitudinal axis overlap in an overlap area, the insulating runners projecting into the overlap area.

3. The device according to claim 2, characterized in that the ends of the conductive runners and the associated ramps form a triangle.

4. The device according to claim 2, characterized in that the ends of the conductive runners connected to one another and of the ramps have an insulating spacing relative to a free end of the ramps disposed on the same side.

5. The device according to claim 2, characterized in that each of the insulating profiles is connected to the associated conductor rail via an electrically conductive double-T profile.

6. The device according to claim 1, characterized in that the ends of the conductive runners and the associated ramps form a triangle.

7. The device according to claim 6, characterized in that each of the insulating profiles is connected to the associated conductor rail via an electrically conductive double-T profile.

8. The device according to claim 1, characterized in that the ends of the conductive runners connected to one another and of the ramps have an insulating spacing relative to a free end of the ramps disposed on the same side.

9. The device according to claim 8, characterized in that each of the insulating profiles is connected to the associated conductor rail via an electrically conductive double-T profile.

10. The device according to claim 1, characterized in that each of the insulating profiles is connected to the associated conductor rail via an electrically conductive a double-T profile.

11. The device according to claim 10, characterized in that the conductive runners are electrically and mechanically connected to the associated conductor rail via the electrically conductive double-T profile.

12. The device according to claim 10, characterized in that the insulating profiles are formed by an electrically insulating material, and are screwed through short spacers to the double-T profile.

13. The device according to claim 12, characterized in that a first spacer is screwed to a horizontal section of the double-T profile and the other spacer is screwed to a vertical section of the double-T profile.

14. The device according to claim 1, characterized in that in top view the conductive runners cross the associated insulating profile and at this point have a recess for forming an air gap between the conductive runners and the corresponding insulating profile.

15. The device according to claim 1, characterized in that the conductive runners, the ramps and the insulating runners are of such a height that they are rigid in their longitudinal direction.

16. The device according to claim 1 characterized in that:
the ends of the conductive runners and the associated ramps form a triangle;
the ends of the conductive runners connected to one another and of the ramps have an insulating spacing relative to a free end of the ramps disposed on the same side;
each of the insulating profiles is connected to the associated conductor rail via an electrically conductive double-T profile; and
the conductive runners are electrically and mechanically connected to the associated conductor rail via the electrically conductive double-T profile.

17. The device according to claim 1 characterized in that:
the ends of the conductive runners and the associated ramps form a triangle;
the ends of the conductive runners connected to one another and of the ramps have an insulating spacing relative to a free end of the ramps disposed on the same side;
each of the insulating profiles is connected to the associated conductor rail via an electrically conductive double-T profile;
the conductive runners are electrically and mechanically connected to the associated conductor rail via the electrically conductive double-T profile;
in top view the conductive runners cross the associated insulating profile and at this point have a recess for forming an air gap between the conductive runners and the corresponding insulating profile; and
the insulating profiles are formed by an electrically insulating material, and are screwed through short spacers to the double-T profile.

18. The device according to claim 1 characterized in that:
the ends of the conductive runners and the associated ramps form a triangle;
the ends of the conductive runners connected to one another and of the ramps have an insulating spacing relative to a free end of the ramps disposed on the same side;
each of the insulating profiles is connected to the associated conductor rail via an electrically conductive double-T profile;
the conductive runners are electrically and mechanically connected to the associated conductor rail via the electrically conductive double-T profile;
in top view the conductive runners cross the associated insulating profile and at this point have a recess for forming an air gap between the conductive runners and the corresponding insulating profile;
the conductive runners, the ramps and the insulating runners are of such a height that they are rigid in their longitudinal direction; and
the insulating profiles are formed by an electrically insulating material, and are screwed through short spacers to the double-T profile via a first spacer screwed to a horizontal section of the double-T profile and another spacer screwed to a vertical section of the double-T profile.

* * * * *